US012670356B2

(12) United States Patent
Vinyals et al.

(10) Patent No.: US 12,670,356 B2
(45) Date of Patent: Jun. 30, 2026

(54) GENERATING REPRESENTATIONS OF INPUT SEQUENCES USING NEURAL NETWORKS

(71) Applicant: Google LLC, Mountain View, CA (US)

(72) Inventors: Oriol Vinyals, London (GB); Quoc V. Le, Sunnyvale, CA (US); Ilya Sutskever, San Francisco, CA (US)

(73) Assignee: Google LLC, Mountain View, CA (US)

( * ) Notice: Subject to any disclaimer, the term of this patent is extended or adjusted under 35 U.S.C. 154(b) by 1176 days.

(21) Appl. No.: 17/643,736

(22) Filed: Dec. 10, 2021

(65) Prior Publication Data

US 2022/0101082 A1 Mar. 31, 2022

Related U.S. Application Data

(63) Continuation of application No. 16/211,635, filed on Dec. 6, 2018, now Pat. No. 11,222,252, which is a
(Continued)

(51) Int. Cl.
*G06N 3/02* (2006.01)
*G06F 40/40* (2020.01)
(Continued)

(52) U.S. Cl.
CPC .............. *G06N 3/02* (2013.01); *G06F 40/40* (2020.01); *G06N 3/0442* (2023.01); *G06N 3/0455* (2023.01)

(58) Field of Classification Search
None
See application file for complete search history.

(56) References Cited

U.S. PATENT DOCUMENTS

| | | | |
|---|---|---|---|
| 8,682,643 | B1 | 3/2014 | Hafez |
| 9,484,023 | B2 | 11/2016 | Arisoy |
| | | (Continued) | |

FOREIGN PATENT DOCUMENTS

| | | |
|---|---|---|
| CN | 1387651 | 12/2002 |
| CN | 1475907 | 2/2004 |
| | (Continued) | |

OTHER PUBLICATIONS

Sutskever et al., Sequence to Sequence Learning with Neural Networks, arXiv:1409.3215v1 [cs. CL] Sep. 10, 2014; Total Pages: 10 (Year: 2014).*
(Continued)

*Primary Examiner* — Alan Chen
(74) *Attorney, Agent, or Firm* — Fish & Richardson P.C.

(57) ABSTRACT
Methods, systems, and apparatus, including computer programs encoded on computer storage media, for generating representations of input sequences. One of the methods includes obtaining an input sequence, the input sequence comprising a plurality of inputs arranged according to an input order; processing the input sequence using a first long short term memory (LSTM) neural network to convert the input sequence into an alternative representation for the input sequence; and processing the alternative representation for the input sequence using a second LSTM neural network to generate a target sequence for the input sequence, the target sequence comprising a plurality of outputs arranged according to an output order.

20 Claims, 4 Drawing Sheets

Related U.S. Application Data continuation of application No. 14/731,326, filed on Jun. 4, 2015, now Pat. No. 10,181,098.

(60) Provisional application No. 62/009,121, filed on Jun. 6, 2014.

(51) Int. Cl.
G06N 3/0442 (2023.01)
G06N 3/0455 (2023.01)

(56) References Cited

U.S. PATENT DOCUMENTS

| | | | |
|---|---|---|---|
| 10,181,098 | B2 | 1/2019 | Vinyals |
| 2004/0002848 | A1 | 1/2004 | Zhou et al. |
| 2006/0136193 | A1 | 6/2006 | Lux-Pogodalla et al. |
| 2014/0229158 | A1 | 8/2014 | Zweig |

FOREIGN PATENT DOCUMENTS

| | | |
|---|---|---|
| CN | 101077011 | 11/2007 |
| EP | 0094293 | 11/1983 |
| EP | 0875832 | 11/1998 |
| WO | WO 200137128 | 5/2001 |

OTHER PUBLICATIONS

Jordan B. Pollack, Recursive Distributed Representations, Elsevier Science Publishers B.V. (North-Holland), Artificial Intelligence 46 (1990)l; pp. 77-105 (Year: 1990).*

Rao et al., Grapheme-To-Phoneme Conversion Using Long Short-Term Memory Recurrent Neural Networks, ICASSP Conference, Apr. 2015; pp. 4225-4229 (Year: 2015).*

Cho et al., Learning Phrase Representations using RNN Encoder-Decoder for Statistical Machine Translation, arXiv:1406.1078v1 [cs.CL] Jun. 3, 2014; Total Pages: 14 (Year: 2014).*

Bengio et al., "Neural probabilistic language models," In Innovations in Machine Learning, vol. 194, pp. 137-186. Springer, 2006.

Cho et al. "Learning Phrase Representations using RNN Encoder-Decoder for Statistical Machine Translation," arXiv preprint arXiv Jun. 3, 2014, 14 pages.

CN Office Action in Chinese Application No. 2015104264010.8, dated Nov. 3, 2020, 11 pages (with English translation).

CN Office Action in Chinese Appln. No. 201510426401.8, dated Feb. 3, 2020, 19 pages (with English translation).

CN Office Action in Chinese Appln. No. 201510426401.8, dated May 20, 2019, 17 pages (with English translation).

CN Office Action issued in Chinese Application No. 201510426401. 8, mailed on Jul. 30, 2018, 13 pages (English Translation).

EP Office Action in European Application No. 15170815.3, dated Apr. 23, 2020, 8 pages.

EP Office Action in European Application No. 20201300.9, dated Feb. 11, 2021, 9 pages.

EP Office Action issued in European Application No. 15170815.3, mailed on Jul. 10, 2018, 8 pages.

EP Result of consultation in European Appln. No. 15170815.3, dated Feb. 19, 2020, 4 pages.

EP Summons to attend oral proceedings pursuant to Rule 115(1) EPC in European Appln. No. 15170815.3, dated Sep. 5, 2019, 9 pages.

Extended European Search Report in European Application No. 15170815.3-1951/2953065, mailed on Nov. 8, 2016, 12 pages.

Graves, "Generating sequences with recurrent neural networks," arXiv:1308.0850v5 [cs.NE], Jun. 2014, pp. 1-43.

Graves. "Sequence Transduction with Recurrent Neural Networks," arXiv preprint arXiv, Nov. 14, 2012, 9 pages.

Hermann and Blunsom, "Multilingual distributed representations without word alignment," In ICLR, 2014, Mar. 2014, pp. 1-9.

Hochreiter and Schmidhuber, "Long Short-Term Memory," Neural Computation 9(8):1735-1780, 1997.

Mikolov et al., "Extensions of recurrent neural network language model," In ICASSP, May 2011, pp. 5528-5531.

Mikolov et al., "Recurrent neural network based language model," In Interspeech, pp. 1045-1048, Sep. 2010.

Qi et al. "RBM-Based Phoneme Recognition by Deep Neural Network Based on RBM," Journal of Information Engineering University, vol. 14(5), 6 pages (with English Abstract).

Rumelhart et al., "Learning representations by back-propagating errors," Nature, 323(6088):533-536, Oct. 1986.

Socher et al. "Dynamic Pooling and Unfolding Recursive Autoencoders for Paraphrase Detection," Advances in neural information processing systems, vol. 24, Jan. 1, 2011, 9 pages.

* cited by examiner

Initialize the initial hidden state of the decoder LSTM neural network

*302*

Generate a set of initial output scores

*304*

Select highest-scoring output score

*306*

Process selected output

*308*

Select highest-scoring output

*310*

400

Initialize the initial hidden state of the decoder LSTM neural network

402

Generate a set of initial output scores

404

Select predetermined number of highest-scoring outputs

406

Generate a respective set of output scores for each maintained possible target sequence for the current position in the output order    408

Generate sequence scores

410

Select predetermined number of candidate target sequences

412

Update maintained possible target sequences

GENERATING REPRESENTATIONS OF INPUT SEQUENCES USING NEURAL NETWORKS

CROSS-REFERENCE TO RELATED APPLICATION

This application claims priority to U.S. application Ser. No. 16/211,635, filed Dec. 16, 2018, which claims priority to U.S. application Ser. No. 14/731,326, filed Jun. 4, 2015, which claim the benefit of U.S. Provisional Application No. 62/009,121, filed on Jun. 6, 2014. The disclosure of the prior application is considered part of and is incorporated by reference in the disclosure of this application.

BACKGROUND

This specification relates to generating representations of input sequences using neural networks.

Many data processing tasks involve converting an ordered sequence of inputs into an ordered sequence of outputs. For example, machine translation systems translate an input sequence of words in one language into a sequence of words in another language. As another example, pronunciation systems convert an input sequence of graphemes into a target sequence of phonemes.

SUMMARY

This specification describes how a system implemented as computer programs on one or more computers in one or more locations can convert an input sequence into a target sequence that is a representation of the input sequence, e.g., a representation of the input sequence in a different form.

Particular embodiments of the subject matter described in this specification can be implemented so as to realize one or more of the following advantages. A target sequence that is a representation of an input sequence in a different form can be accurately predicted. For example, a machine translation system can accurately predict the translation for a received sequence of words. As another example, a grapheme-to-phoneme system can accurately predict the sequence of phonemes that represents a received grapheme sequence. As another example, an autoencoder system can accurately autoencode a received sequence.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow diagram of an example process for performing a beam search decoding using a decoder LSTM neural network.

Like reference numbers and designations in the various drawings indicate like elements.

DETAILED DESCRIPTION

Figure 1:
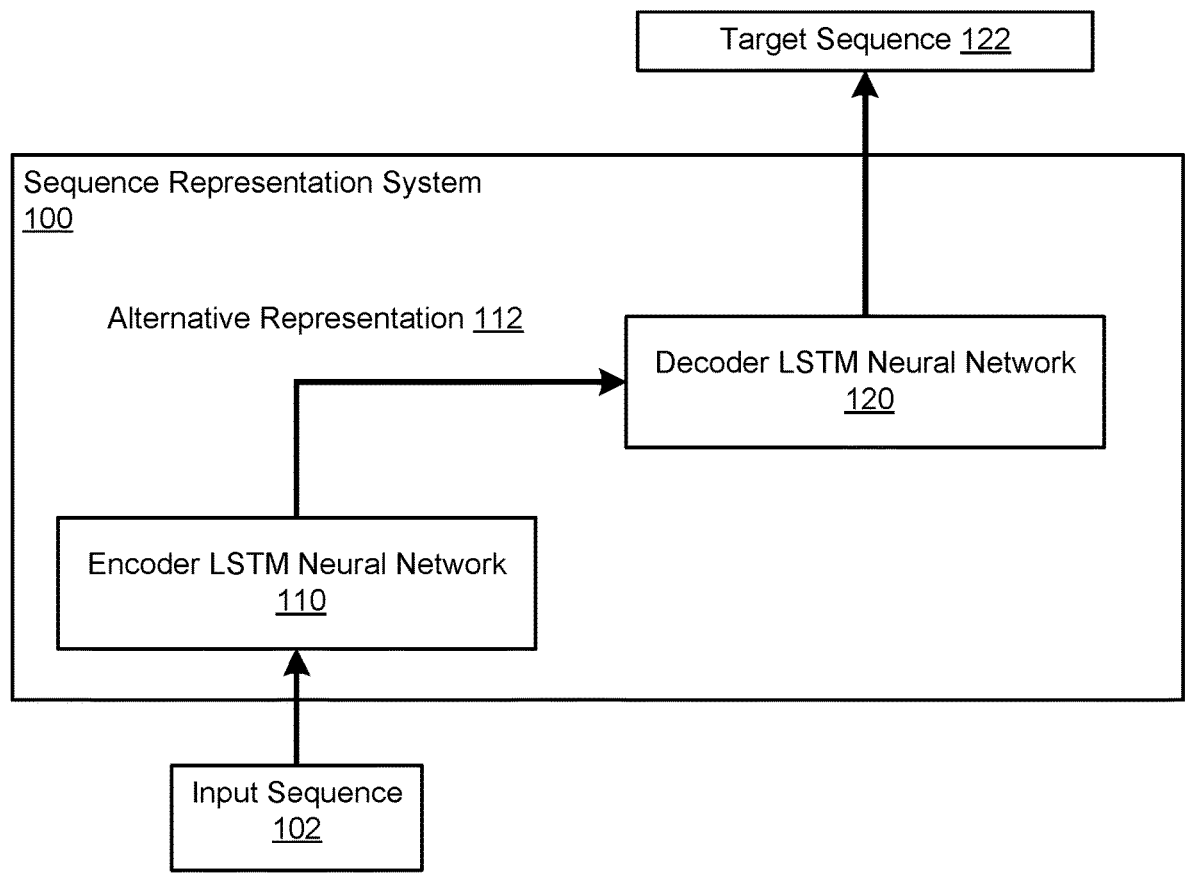
FIG. 1 shows an example sequence representation system.

FIG. 1 shows an example sequence representation system 100. The sequence representation system 100 is an example of a system implemented as computer programs on one or more computers in one or more locations, in which the systems, components, and techniques described below can be implemented.

The sequence representation system 100 receives input sequences and converts the input sequences to target sequences. Each target sequence is a representation of the input sequence, e.g., a representation of the input sequence in a different form. For example, the sequence representation system 100 can receive an input sequence 102 and generate a target sequence 122 for the input sequence 102. The target sequence 122 for the input sequence 102 is an ordered sequence of outputs that the sequence representation system 100 has classified as representing the input sequence. For example, if the input sequence 102 is a sequence of words in an original language, e.g., a sentence or phrase, the target sequence 122 generated by the sequence representation system 100 may be a translation of the input sequence into a target language, i.e., a sequence of words in the target language that represents the sequence of words in the original language. As another example, if the input sequence 102 is a sequence of graphemes, e.g., the sequence {g, o, o, g, l, e}, the target sequence 122 generated by the sequence representation system 100 may be a phoneme representation of the input sequence, e.g., the sequence {g, uh, g, ax, l}.

Generally, the input sequences received by the sequence representation system 100 and the target sequences generated by the sequence representation system 100 are variable-length sequences, i.e., sequences that can contain varying numbers of inputs and outputs, respectively. Additionally, the number of outputs in a target sequence generated by the sequence representation system 100 may be the same as or different from the number of inputs in the input sequence from which the target sequence was generated.

The sequence representation system 100 includes an encoder long short-term memory (LSTM) neural network 110 and a decoder LSTM neural network 120.

As part of generating a target sequence from an input sequence, the sequence representation system 100 processes the input sequence using the encoder LSTM neural network 110 to generate an alternative representation for the input sequence, e.g., an alternative representation 112 for the input sequence 102.

The encoder LSTM neural network 110 is a recurrent neural network that receives an input sequence and generates an alternative representation from the input sequence. In particular, the encoder LSTM neural network 110 is an LSTM neural network that includes one or more LSTM neural network layers, with each of the LSTM layers including one or more LSTM memory blocks. Each LSTM memory block can include one or more cells that each include an input gate, a forget gate, and an output gate that allow the cell to store previous activations generated by the cell, e.g., as a hidden state for use in generating a current activation or to be provided to other components of the LSTM neural network 110. An example LSTM neural network is described in more detail in "Generating sequences with recurrent neural networks," Alex Graves, available at http://arxiv.org/abs/1308.0850v5.

The encoder LSTM neural network 110 has been configured, e.g., through training, to process each input in a given input sequence to generate the alternative representation of the input sequence in accordance with a set of parameters. In particular, the encoder LSTM neural network 110 is configured to receive each input in the input sequence in the input order and, for a given received input, to update the current hidden state of the encoder LSTM neural network 110 by processing the received input, i.e., to modify the current hidden state of the encoder LSTM neural network 110 that has been generated by processing previous inputs from the input sequence by processing the current received input.

Generating an alternative representation using the encoder LSTM neural network is described in more detail below with reference to FIG. 2.

The sequence representation system 100 processes the generated alternative representation of the input sequence using the decoder LSTM neural network 120 to generate the target sequence for the input sequence. For example, the sequence representation system 100 can process the alternative representation 112 using the decoder LSTM neural network 120 to generate the target sequence 122 for the input sequence 102.

The decoder LSTM neural network 120 is an LSTM neural network that includes one or more LSTM layers and that is configured receive a current output in a target sequence and to generate a respective output score for each of a set of possible outputs from the current output and in accordance with the current hidden state of the decoder LSTM neural network 120 and current values of a set of parameters. The output score for a given output represents the likelihood that the output is the next output in the target sequence, i.e., that the output immediately follows the current output in the target sequence. As part of generating the output scores, the decoder LSTM neural network 120 also updates the hidden state of the network to generate an updated hidden state.

The set of possible outputs includes a vocabulary of possible outputs and a designated end-of-sentence token. The outputs in the vocabulary of outputs are outputs that have been provided to the system as being possible representations of inputs received by the system, e.g., words in a target language if inputs to the system are words in an original language and the system translates input sequences from the original language to the target language, phonemes if inputs to the system are graphemes and the system generates phoneme representations of grapheme sequences, or that includes each possible input to the system if the system is an autoencoder. The end-of-sentence token is a designated output that is not in the vocabulary of possible outputs.

Processing an alternative representation using the decoder LSTM neural network to generate a target sequence is described in more detail below with reference to FIGS. 2 and 3.

Figure 2:
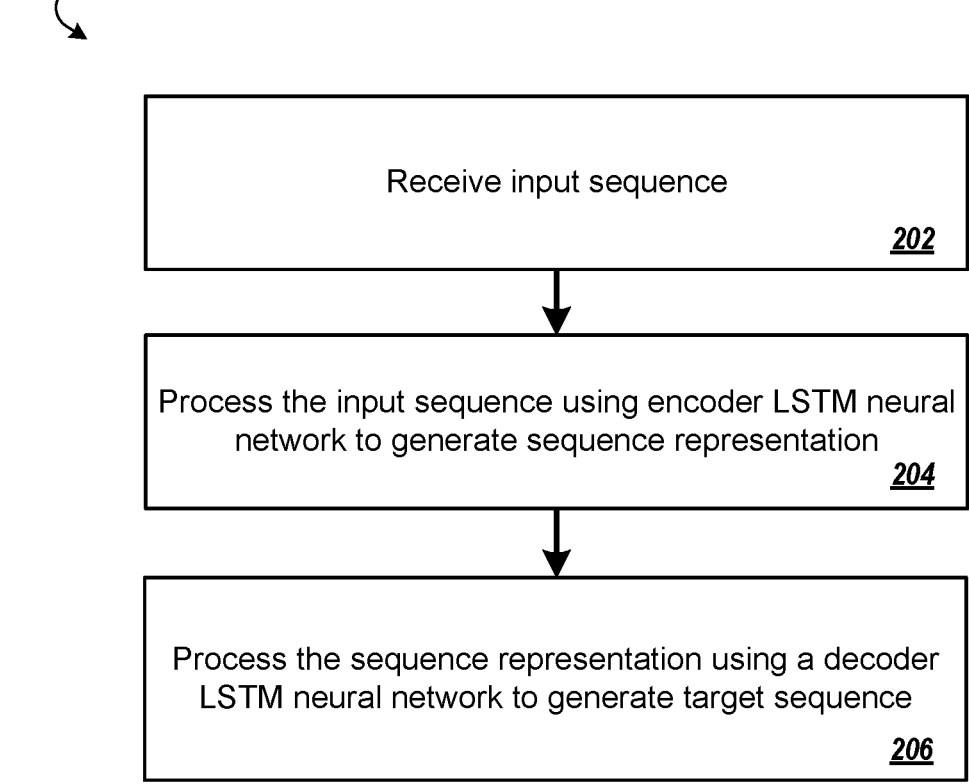
FIG. 2 is a flow diagram of generating a target representation of an input sequence.

FIG. 2 is a flow diagram of an example process 200 for generating a target sequence from an input sequence. For convenience, the process 200 will be described as being performed by a system of one or more computers located in one or more locations. For example, a sequence representation system, e.g., the sequence representation system 100 of FIG. 1, appropriately programmed, can perform the process 200.

The system obtains an input sequence (step 202). The input sequence includes a set of inputs arranged according to an input order. For example, the input sequence may be a sequence of graphemes to be converted into a corresponding sequence of phonemes or a sequence of words in one language to be translated into a sequence of words in a different language.

The system processes the input sequence using an encoder LSTM neural network, e.g., the encoder LSTM neural network 110 of FIG. 1, to convert the input sequence into an alternative representation for the input sequence (step 204).

As part of processing the input sequence, the system modifies the input sequence to insert the end-of-sentence token or a different designated token at the end of the input sequence, i.e., after the input in the last position of the input order, to generate a modified input sequence. The designated token is a designated input that is not in a vocabulary of possible inputs that may be included in input sequences processed by the system and, if the designated token is the end-of-sentence token, is also not in the vocabulary of possible outputs.

The system then processes each input in the modified input sequence using the encoder LSTM neural network to generate the alternative representation for the input sequence. In particular, the system generates the alternative representation from the hidden state of the encoder LSTM neural network. For example, the alternative representation may be the hidden state of the encoder LSTM after the designated token at the end of the input sequence has been processed, i.e., the last hidden state of the encoder LSTM. Thus, because the system generates the alternative representation from the hidden state of the encoder LSTM neural network, the alternative representation of the input sequence is a fixed-length representation, i.e., the number of elements in the alternative representation is fixed and is not dependent on the number of inputs in the input sequence. For example, the LSTM hidden state and, accordingly, the alternative representation may be a vector of numeric values that has a fixed dimensionality, e.g., a vector of floating point values or of quantized representations of floating point values.

The system processes the alternative representation using a decoder LSTM neural network, e.g., the decoder LSTM neural network 120 of FIG. 1, to generate a target sequence for the input sequence (step 206). The target sequence is a sequence of outputs arranged according to an output order.

Generally, the system processes the alternative representation using the decoder LSTM neural network by initializing an initial hidden state of the decoder LSTM to the alternative representation of the input sequence, i.e., setting the initial state hidden state equal to the alternative representation.

For example, in the context where the system is configured to receive an input sequence of words in an original language and to generate a target sequence of words in a target language that is a translation of the words in the input sequence into the target language, the system can receive an input sequence of words in the original language and add the designated token at the end of the input sequence. The system can then process the modified input sequence using the encoder LSTM neural network to generate an alternative representation of the input sequence and process the alternative representation using the decoder LSTM neural network to generate a target sequence of words in the target language that is a translation of the input sequence into the target language.

Figure 3:
FIG. 3 is a flow diagram of an example process for generating a target sequence using a decoder LSTM neural network.
Figure 3:
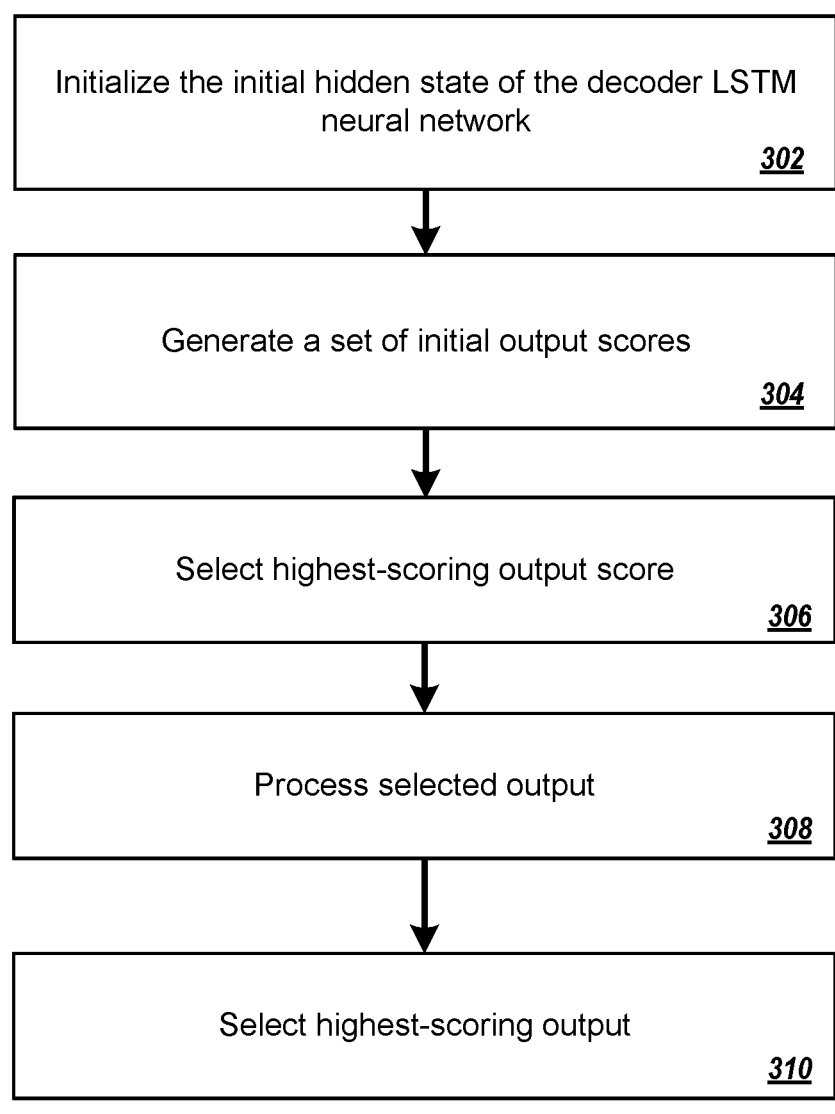

FIG. 3 is a flow diagram of an example process 300 for generating a target sequence using a decoder LSTM neural network. For convenience, the process 300 will be described as being performed by a system of one or more computers located in one or more locations. For example, a sequence representation system, e.g., the sequence representation system 100 of FIG. 1, appropriately programmed, can perform the process 300.

The system initializes the initial hidden state of the decoder LSTM neural network to the alternative representation of the input sequence (step 302).

The system generates a set of initial output scores using the decoder LSTM neural network in accordance with the initial hidden state (step 304). That is, the system processes an initial placeholder output, e.g., an output that is all zeroes, using the decoder LSTM neural network in accordance with the initial hidden state to generate the initial output scores and to generate an updated hidden state using the initial hidden state.

The system selects a highest-scoring output according to the initial output scores as the first output in the target sequence (step 306).

The system processes the selected output using the decoder LSTM neural network to generate a set of next output scores (step 308). That is, the system processes the selected output in accordance with the updated hidden state of the network to generate the set of next output scores and to again update the hidden state of the network.

The system selects a highest-scoring output according to the next output scores as the next output in the target sequence (step 310).

The system can repeat steps 308 and 310 to add outputs to the target sequence and to update the hidden state of the network until the highest-scoring output is the end-of-sentence token rather than one of the outputs from the vocabulary of outputs. The system can then consider, as the target sequence, the sequence of the selected outputs that were selected prior to the end-of-sentence token being the highest-scoring output.

In some implementations, the system generates multiple possible target sequences and determines a respective sequence score for each possible target sequence. The system can then select the possible target sequence having the highest sequence score as the target sequence. In particular, the system can generate the possible target sequences by performing a beam search decoding using the decoder LSTM neural network.

FIG. 4 is a flow diagram of an example process 400 for performing a beam search decoding using a decoder LSTM neural network. For convenience, the process 400 will be described as being performed by a system of one or more computers located in one or more locations. For example, a sequence representation system, e.g., the sequence representation system 100 of FIG. 1, appropriately programmed, can perform the process 400.

The system initializes the initial hidden state of the decoder LSTM neural network to the alternative representation of the input sequence (step 402).

The system generates the set of initial output scores using the decoder LSTM neural network in accordance with the initial hidden state (step 404).

The system selects a predetermined number of highest-scoring possible outputs according to the initial scores (step 406). The system generates a respective possible target sequence for each selected possible output, each possible target sequence including the corresponding selected possible output at the first position in the output order. The system associates the possible target sequence with the initial score for the corresponding possible output as the sequence score for the possible target sequence.

The system generates a respective set of output scores for each maintained possible target sequence for the current position in the output order (step 408). That is, for each maintained possible target sequence, the system processes the current output in the possible target sequence using the decoder LSTM neural network to generate a set of output scores in accordance with the current hidden state of the decoder LSTM neural network for the possible output sequence. The set of output scores includes a respective output score for each of the set of possible outputs. The system processes each maintained possible target sequence independently from each other maintained possible target sequence, so that the hidden state of the decoder LSTM used to generate the set of output scores for the current output in a given possible target sequence is based only on the processing of the possible target sequence and not on the selected outputs for any other possible target sequence.

For example, once the system has selected the possible outputs for the first position in the output order, the system can process each of the selected first position outputs using the decoder LSTM neural network to generate a respective set of output scores for each selected first position output.

The system generates, for each maintained possible target sequence, a respective sequence score for each possible candidate target sequence that can be generated from the possible target sequence (step 410). A candidate target sequence for a given possible target sequence is a sequence that appends one of the possible outputs to the end of the possible target sequence. The sequence score for the candidate target sequence is the sequence score for the possible target sequence multiplied by the output score for the appended possible output.

The system selects the predetermined number of candidate target sequences that have the highest sequence scores (step 412).

The system updates the maintained possible target sequences to be the selected candidate target sequences (step 414).

When a selected candidate target sequence ends with the end-of-sentence token, the system removes the selected candidate target sequence from the beam, i.e., stops adding additional outputs to the selected candidate target sequence, and considers the selected candidate target sequence prior to the end-of-sentence token being added to be a final possible target sequence. The system also reduces the predetermined number of sequences to be maintained by one.

The system can repeat steps 408-414 of the process 400 until each maintained possible target sequence has been finalized. The system can then select the final possible target sequence having the highest sequence score as the target sequence for the input sequence or can provide multiple ones of the final possible target sequences as possible target sequences for the input sequence.

In order to configure the encoder LSTM neural network and the decoder LSTM neural network, the system can train the networks using conventional machine learning training techniques, e.g., using Stochastic Gradient Descent. In particular, the system can train the networks jointly by back-propagating gradients computed for the decoder LSTM neural network back to the encoder LSTM neural network to adjust the values of the parameters of the encoder LSTM neural network during the training technique.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:

obtaining an input sequence, the input sequence comprising a plurality of inputs arranged according to an input order;

processing the input sequence with an encoder network to convert the input sequence into an alternative representation of the input sequence;

processing the alternative representation of the input sequence with a decoder network in accordance with an initial version of a hidden state of the decoder network to predict a first output of a target sequence for the input sequence, wherein the target sequence comprises a plurality of outputs arranged according to an output order, wherein the hidden state of the decoder network is updated as a result of processing the alternative representation for the input sequence;

for each output of the target sequence after the first output, processing a preceding output that was predicted for a preceding position of the target sequence with the decoder network in accordance with a current version of the hidden state of the decoder network to predict a next output of the target sequence, wherein the hidden state of the decoder network is updated as a result of processing each preceding output to predict each next output of the target sequence, wherein the alternative representation of the input sequence is processed with the decoder network just once to predict only the first output of the target sequence.

2. The method of claim 1, wherein the input sequence is a variable length input sequence.

3. The method of claim 2, wherein the alternative representation is a vector of fixed dimensionality.

4. The method of claim 1, comprising:

adding an end-of-sentence token to the end of the input sequence to generate a modified input sequence; and processing the modified input sequence with the encoder network to generate the alternative representation.

5. The method of claim 1, wherein processing the alternative representation of the input sequence with the decoder network comprises initializing the hidden state of the decoder network to the alternative representation of the input sequence.

6. The method of claim 1, wherein processing the alternative representation of the input sequence with the decoder network comprises using a left to right beam search decoding technique.

7. The method of claim 1, comprising training the encoder network and the decoder network using Stochastic Gradient Descent.

8. The method of claim 1, wherein the input sequence is a sequence of words in a first language and the target sequence is a translation of the sequence of words into a second language.

9. The method of claim 1, wherein the input sequence is a sequence of words and the target sequence is an autoencoding of the input sequence.

10. The method of claim 1, wherein the input sequence is a sequence of graphemes and the target sequence is a phoneme representation of the sequence of graphemes.

11. The method of claim 1, wherein the encoder network comprises a first long short-term memory (LSTM) neural network and the decoder network comprises a second LSTM neural network.

12. A system comprising one or more computers and one or more storage devices storing instructions that when executed by the one or more computers cause the one or more computers to perform operations comprising:

obtaining an input sequence, the input sequence comprising a plurality of inputs arranged according to an input order;

processing the input sequence with an encoder network to convert the input sequence into an alternative representation of the input sequence;

processing the alternative representation of the input sequence with a decoder network in accordance with an initial version of a hidden state of the decoder network to predict a first output of a target sequence for the input sequence, wherein the target sequence comprises a plurality of outputs arranged according to an output order, wherein the hidden state of the decoder network is updated as a result of processing the alternative representation for the input sequence;

for each output of the target sequence after the first output, processing a preceding output that was predicted for a preceding position of the target sequence with the decoder network in accordance with a current version of the hidden state of the decoder network to predict a next output of the target sequence, wherein the hidden state of the decoder network is updated as a result of processing each preceding output to predict each next output of the target sequence, wherein the alternative representation of the input sequence is processed with the decoder network just once to predict only the first output of the target sequence.

13. The system of claim 12, wherein the input sequence is a variable length input sequence.

14. The system of claim 13, wherein the alternative representation is a vector of fixed dimensionality.

15. The system of claim 12, wherein the operations comprise:

adding an end-of-sentence token to the end of the input sequence to generate a modified input sequence; and processing the modified input sequence with the encoder network to generate the alternative representation.

16. The system of claim 12, wherein processing the alternative representation of the input sequence with the decoder network comprises initializing the hidden state of the decoder network to the alternative representation of the input sequence.

17. The system of claim 12, wherein the input sequence is a sequence of words in a first language and the target sequence is a translation of the sequence of words into a second language.

18. The system of claim 12, wherein the input sequence is a sequence of words and the target sequence is an autoencoding of the input sequence.

19. The system of claim 12, wherein the input sequence is a sequence of graphemes and the target sequence is a phoneme representation of the sequence of graphemes.

20. A computer program product encoded on one or more non-transitory storage media, the computer program product comprising instructions that when executed by the one or more computers cause the one or more computers to perform operations comprising:

obtaining an input sequence, the input sequence comprising a plurality of inputs arranged according to an input order;

processing the input sequence with an encoder network to convert the input sequence into an alternative representation of the input sequence;

processing the alternative representation of the input sequence with a decoder network in accordance with an initial version of a hidden state of the decoder network to predict a first output of a target sequence for the input sequence, wherein the target sequence comprises a plurality of outputs arranged according to an output order, wherein the hidden state of the decoder network is updated as a result of processing the alternative representation for the input sequence;

for each output of the target sequence after the first output, processing a preceding output that was predicted for a preceding position of the target sequence with the decoder network in accordance with a current version of the hidden state of the decoder network to predict a next output of the target sequence, wherein the hidden state of the decoder network is updated as a result of processing each preceding output to predict each next output of the target sequence, wherein the alternative representation of the input sequence is processed with the decoder network just once to predict only the first output of the target sequence.

* * * * *